No. 737,075. PATENTED AUG. 25, 1903.
J. CARLSON.
SPLIT GEAR WHEEL.
APPLICATION FILED JUNE 2, 1903.
NO MODEL.

Witnesses:
Arthur Zumpe
William Schulz

Inventor:
John Carlson
by his attorney
Frank v. Briesen

No. 737,075. Patented August 25, 1903.

UNITED STATES PATENT OFFICE.

JOHN CARLSON, OF NEW YORK, N. Y.

SPLIT GEAR-WHEEL.

SPECIFICATION forming part of Letters Patent No. 737,075, dated August 25, 1903.

Application filed June 2, 1903. Serial No. 159,789. (No model.)

*To all whom it may concern:*

Be it known that I, JOHN CARLSON, a citizen of the United States, residing at New York city, (Brooklyn,) county of Kings, and State of New York, have invented certain new and useful Improvements in Split Gear-Wheels, of which the following is a specification.

This invention relates to a split gear-wheel which is so constructed that the rim-joint breaks line with the hub-joint and that the parts are so connected as to obtain a split gear-wheel having minimum parts and possessing superior strength.

Figure 1:
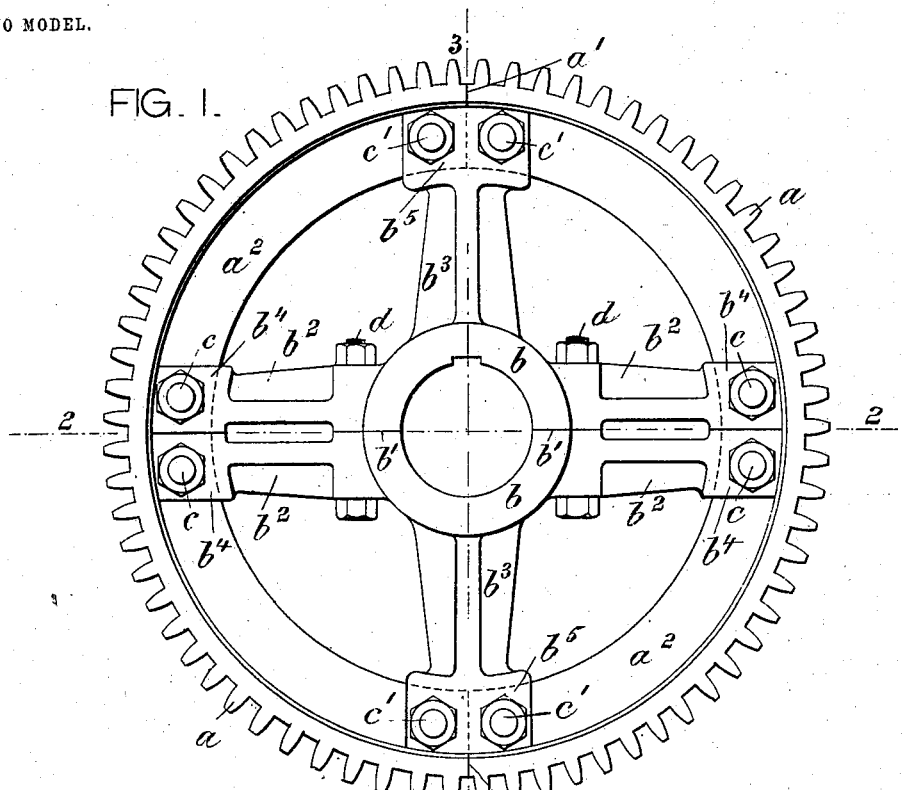
Figure 2:
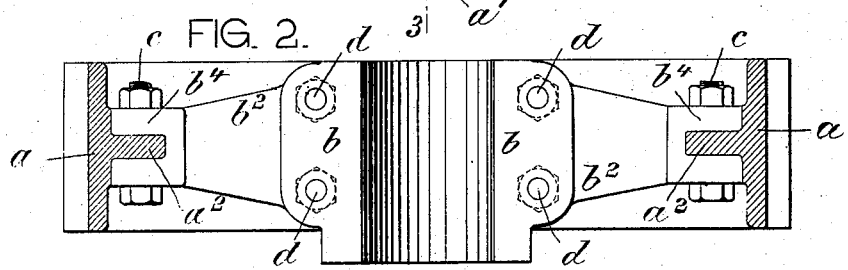
Figure 3:
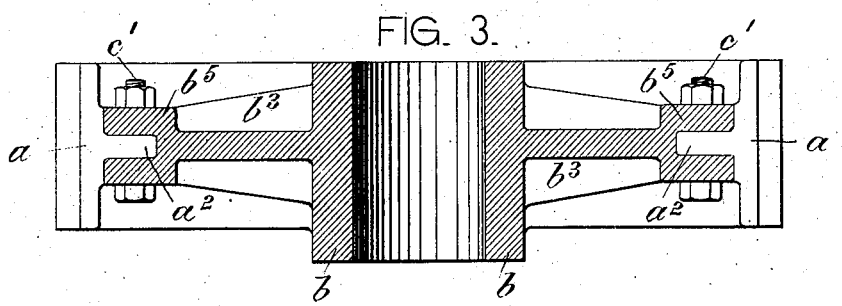

In the accompanying drawings, Figure 1 is a face view of my improved gear-wheel; Fig. 2, a cross-section on line 2 2, Fig. 1; and Fig. 3, a cross-section on line 3 3, Fig. 1.

The rim of the gear-wheel is composed of two equal semicircular sections $a\ a$, which contact at the diametrically opposite lines $a'$. Each section is T-shaped in cross-section, being provided with a toothed flange and with a web $a^2$, projecting inwardly at right angles to the flange. The hub of the wheel is also composed of two semicircular sections $b\ b$, which contact at the diametrically opposite lines $b'$, such lines being arranged at right angles to the lines $a'$. Each hub-section is provided with two integral diametrically-placed arms $b^2$ and with a third integral arm $b^3$, set at right angles to arms $b^2$. At their ends the arms $b^2\ b^3$ are forked, as at $b^4\ b^5$, to straddle the webs $a^2$ of the rims $a$.

In assembling the parts each pair of adjoining arms $b^2$ will straddle a common solid section of the web $a^2$ intermediate the joints $a'$, while each of the arms $b^3$ will project over one of such joints. Each of the two adjoining arms $b^2$ is connected to the common web $a^2$ by a bolt $c$, while each arm $b^3$ is connected by a separate bolt $c'$ to each of the two webs $a^2$. Bolts $d$ serve to connect directly the two adjoining arms $b^2$ near the hub.

It will be seen that by the construction described the two halves of the hub are solidly connected to one another by the two rim-sections and that in turn the two rim-sections are solidly connected to each other by the hub or that, in other words, the hub-joint breaks line with the rim-joint. The result is that the sectional gear-wheel made according to my invention is composed of a minimum number of parts and is as strong for all practical purposes as a solid gear-wheel.

What I claim is—

In a split gear-wheel, a pair of semicircular hub-sections having each three forked arms of which two are arranged in alinement, combined with a pair of semicircular toothed rim-sections having a web which is straddled by the forked arms, bolts that connect the forked arms to the web of the rim-sections, and bolts that connect the adjoining arms of the hub-sections, the hub-sections being arranged to break joint with the rim-sections, substantially as specified.

Signed by me at New York city, (Brooklyn), New York, this 29th day of May, 1903.

JOHN CARLSON.

Witnesses:
JOHN B. WITHERBU,
LEROY K. VAN DUYNE.